(12) United States Patent
Mobin et al.

(10) Patent No.: US 8,332,528 B2
(45) Date of Patent: Dec. 11, 2012

(54) PERSONAL BROADCAST AND CONTENT DELIVERY ENGINE

(75) Inventors: Dil Afroz Mobin, Orefield, PA (US); Mohammad S. Mobin, Orefield, PA (US); Gregory W. Sheets, Breinigsville, PA (US)

(73) Assignee: Agere Systems LLC, Allentown, PA (US)

( * ) Notice: Subject to any disclaimer, the term of this patent is extended or adjusted under 35 U.S.C. 154(b) by 517 days.

(21) Appl. No.: 12/273,128

(22) Filed: Nov. 18, 2008

(65) Prior Publication Data

US 2010/0125672 A1 May 20, 2010

(51) Int. Cl.
G06F 15/16 (2006.01)
(52) U.S. Cl. ...................................... 709/231
(58) Field of Classification Search ............... 709/231
See application file for complete search history.

(56) References Cited

U.S. PATENT DOCUMENTS

| | | | | |
|---|---|---|---|---|
| 5,367,330 | A * | 11/1994 | Haave et al. | 725/104 |
| 6,769,127 | B1 * | 7/2004 | Bonomi et al. | 725/39 |
| 6,791,904 | B1 * | 9/2004 | Herron et al. | 368/13 |
| 6,934,735 | B1 * | 8/2005 | Emens et al. | 709/203 |
| 7,289,506 | B1 * | 10/2007 | Hannuksela | 370/394 |
| 2001/0052000 | A1 * | 12/2001 | Giacalone, Jr. | 709/218 |
| 2002/0133830 | A1 * | 9/2002 | Kim et al. | 725/142 |
| 2003/0004793 | A1 * | 1/2003 | Feuer et al. | 705/14 |
| 2003/0051250 | A1 * | 3/2003 | Sugimoto et al. | 725/95 |
| 2003/0051251 | A1 * | 3/2003 | Sugimoto et al. | 725/95 |
| 2003/0054881 | A1 * | 3/2003 | Hedrick et al. | 463/29 |
| 2003/0084126 | A1 * | 5/2003 | Kumar et al. | 709/219 |
| 2003/0163646 | A1 * | 8/2003 | O'Neil | 711/137 |
| 2003/0167337 | A1 * | 9/2003 | Liew et al. | 709/231 |
| 2004/0024844 | A1 * | 2/2004 | Holmstead | 709/219 |
| 2004/0215804 | A1 * | 10/2004 | Tan | 709/231 |
| 2004/0215805 | A1 * | 10/2004 | Tan et al. | 709/231 |
| 2004/0216163 | A1 * | 10/2004 | Whitcomb | 725/74 |
| 2005/0021678 | A1 * | 1/2005 | Simyon et al. | 709/219 |
| 2005/0080904 | A1 * | 4/2005 | Green | 709/227 |
| 2005/0108770 | A1 | 5/2005 | Karaoguz et al. | |
| 2005/0183120 | A1 | 8/2005 | Jain et al. | |
| 2005/0207411 | A1 * | 9/2005 | Ota et al. | 370/389 |
| 2005/0208930 | A1 * | 9/2005 | Zmrzli | 455/414.4 |
| 2005/0216934 | A1 * | 9/2005 | Weinraub et al. | 725/36 |
| 2005/0235330 | A1 * | 10/2005 | O'Donnell et al. | 725/87 |
| 2005/0245256 | A1 * | 11/2005 | Takeichi et al. | 455/433 |
| 2006/0050736 | A1 * | 3/2006 | Segel | 370/474 |
| 2006/0074550 | A1 * | 4/2006 | Freer et al. | 701/209 |

(Continued)

*Primary Examiner* — Imad Hussain
(74) *Attorney, Agent, or Firm* — Mendelsohn, Drucker & Associates, P.C.; Yuri Gruzdkov; Steve Mendelsohn (57) ABSTRACT

A communication system that enables a specified end-user device to obtain a media file corresponding to a delayed-play entry of a content-definition table prior to the scheduled play time. To deliver the media file to the end user, a service provider requests and receives the corresponding content from a content provider, generates the media file based on the received content, and temporarily stores the media file in a storage unit associated with the service provider. The service provider then breaks the media file into a plurality of data frames and transmits them to the end-user device during an appropriate delivery-opportunity window for storage in local storage unit (e.g., a hard drive) associated with the end-user device. At the play time, the service provider transmits to the end-user device a media-activation packet to initiate rendering thereat a copy of the media file assembled from the data frames stored in the local storage unit.

17 Claims, 4 Drawing Sheets

| Content | Play Time | Target(s) |
|---|---|---|
| http://news.bbc.co.uk/2/hi/americas/6215636.stm (3:00 PM News Program) | 5:00 PM | Primary: PDA  Secondary: cell phone |
| Das Erste News (live news) | 8:00PM | Primary: home TV |
| http://youtube.com/watch?v=-ShGhmq (five most-watched clips) | 11:00 PM | Primary: home PC |

U.S. PATENT DOCUMENTS

| | | | |
|---|---|---|---|
| 2006/0077844 A1* | 4/2006 | Suzuki | 369/53.12 |
| 2006/0248557 A1* | 11/2006 | Stark et al. | 725/37 |
| 2007/0005647 A1* | 1/2007 | Cugi et al. | 707/104.1 |
| 2007/0076662 A1* | 4/2007 | Jain et al. | 370/331 |
| 2007/0124769 A1 | 5/2007 | Casey et al. | |
| 2007/0174287 A1* | 7/2007 | McEnroe et al. | 707/10 |
| 2007/0186006 A1* | 8/2007 | Murray | 709/231 |
| 2008/0059533 A1* | 3/2008 | Krikorian | 707/104.1 |
| 2008/0285496 A1* | 11/2008 | Fuchs et al. | 370/311 |
| 2008/0307479 A1* | 12/2008 | Jones et al. | 725/115 |
| 2009/0100100 A1* | 4/2009 | Chu et al. | 707/104.1 |
| 2009/0129264 A1* | 5/2009 | Bugenhagen et al. | 370/230 |
| 2009/0138604 A1* | 5/2009 | Collet et al. | 709/227 |
| 2009/0161765 A1* | 6/2009 | Joyce et al. | 375/240.23 |
| 2009/0164600 A1* | 6/2009 | Issa et al. | 709/215 |
| 2009/0240721 A1* | 9/2009 | Giacalone, Jr. | 707/101 |
| 2009/0249222 A1* | 10/2009 | Schmidt et al. | 715/751 |
| 2010/0138870 A1* | 6/2010 | Anthru et al. | 725/54 |
| 2010/0279653 A1* | 11/2010 | Poltorak | 455/410 |
| 2010/0325153 A1* | 12/2010 | Thakkar et al. | 707/770 |

* cited by examiner

Fig. 1

| Content | Play Time | Target(s) |
|---|---|---|
| http://news.bbc.co.uk/2/hi/americas/6215636.stm (3:00 PM News Program) | 5:00 PM | Primary: PDA  Secondary: cell phone |
| Das Erste News (live news) | 8:00 PM | Primary: home TV |
| http://youtube.com/watch?v=-ShGhmq (five most-watched clips) | 11:00 PM | Primary: home PC |

PERSONAL BROADCAST AND CONTENT DELIVERY ENGINE

BACKGROUND OF THE INVENTION

1. Field of the Invention

The present invention relates generally to the distribution of entertainment and information content.

2. Description of the Related Art

This section introduces aspects that may help facilitate a better understanding of the invention(s). Accordingly, the statements of this section are to be read in this light and are not to be understood as admissions about what is in the prior art or what is not in the prior art.

In recent years, entertainment and information options for consumers have expanded dramatically. A great variety of content is available via cable networks, satellite-based broadcast systems, and the Internet. In addition, a great variety of devices, such as wireless phones, personal digital assistants, game consoles, TV sets, and personal computers, provide significant flexibility in the modes of consumption of such content. As a result, there is a trend toward consuming (e.g., viewing, listening to, and/or interacting with) entertainment and information content when and where an individual consumer desires. However, tools for facilitating such personalized content consumption are not sufficiently developed yet.

SUMMARY OF THE INVENTION

Problems in the prior art are addressed by various embodiments of a communication system that enables a specified end-user device to obtain a media file corresponding to a delayed-play entry of a content-definition table prior to the scheduled play time. To deliver the media file to the end user, a service provider requests and receives the corresponding content from a content provider, generates the media file based on the received content, and temporarily stores the media file in a storage unit associated with the service provider. The service provider then breaks the media file into a plurality of data frames and transmits them to the end-user device during an appropriate delivery-opportunity window for storage in a local storage unit (e.g., a hard drive) associated with the end-user device. At the play time, the service provider transmits to the end-user device a small media-activation packet to initiate rendering thereat a copy of the media file assembled from the data frames stored in the local storage unit. Advantageously, the media file can be rendered without any detrimental effects, e.g., stemming from a possible relatively high traffic load in the content delivery infrastructure at the play time.

According to one embodiment, the present invention is a method of distributing content implemented at a content-delivery service provider. The method has the steps of: (A) maintaining a content-definition table having a delayed-play entry that specifies (i) a play time and (ii) a first target device; (B) determining presence of a first delivery-opportunity window; and (C) during the first delivery-opportunity window, transmitting a media file corresponding to the delayed-play entry over a first network to the first target device for storage in a first local storage unit associated with the first target device to enable the first target device to render the media file at the play time specified in the content-definition table.

According to another embodiment, the present invention is a content-delivery service provider having: (A) means for maintaining a content-definition table having a delayed-play entry that specifies (i) a play time and (ii) a first target device; (B) means for determining presence of a first delivery-opportunity window; and (C) means for transmitting a media file corresponding to the delayed-play entry over a first network to the first target device during the first delivery-opportunity window for storage in a first local storage unit associated with the first target device to enable the first target device to render the media file at the play time specified in the content-definition table.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1:
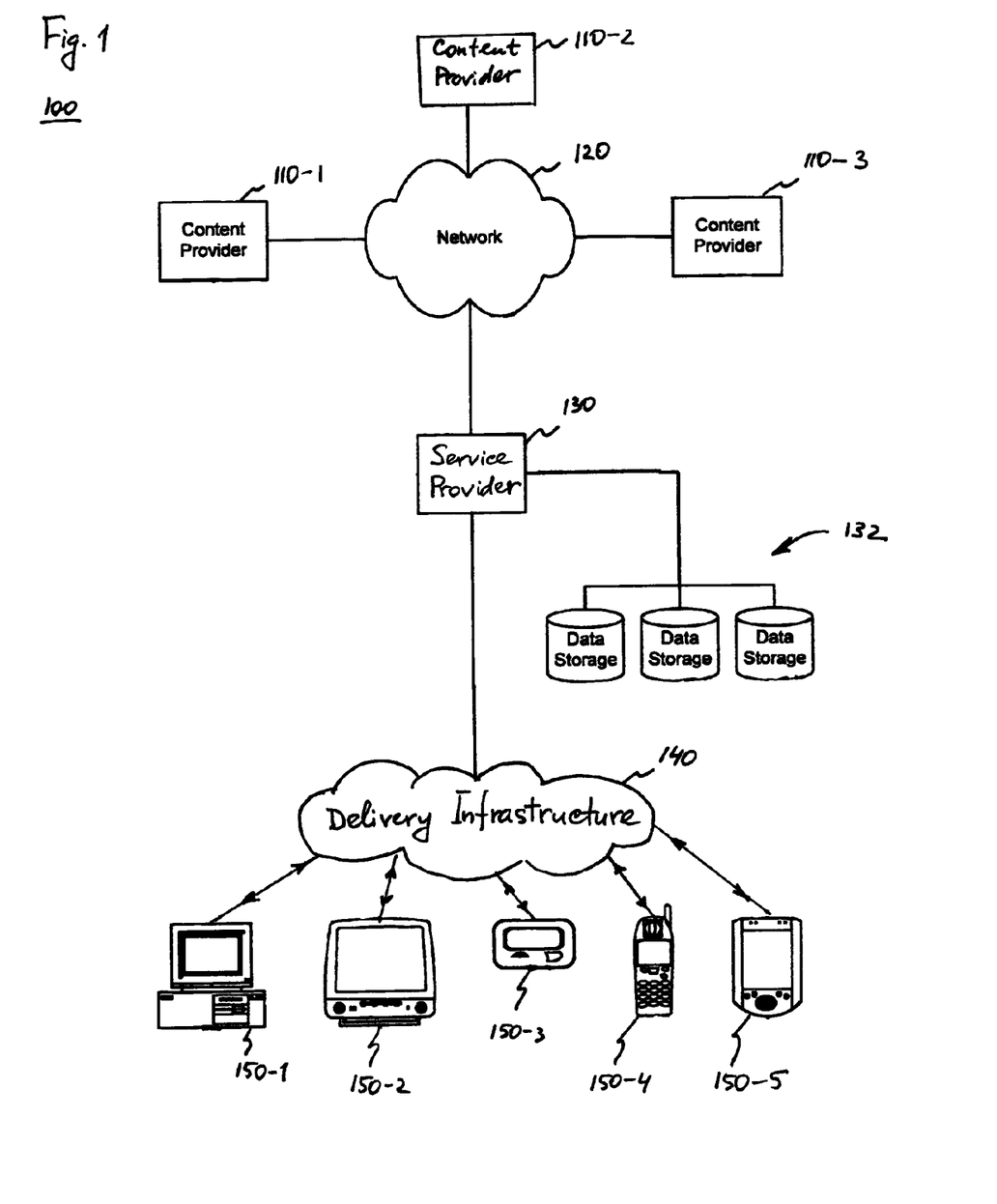
FIG. 1 shows a block diagram of a communication system in which various embodiments of the invention can be practiced.

FIG. 1 shows a block diagram of a communication system 100 in which various embodiments of the invention can be practiced. System 100 has a service provider 130 connected via a network 120 to a plurality of content providers 110. Network 120 can be composed of the Internet, a telecommunications provider's network, a cable television distribution network, and/or any public or private network capable of transporting entertainment and information content (e.g., video, audio, text, and data). An individual content provider 110 can be a television studio or station, a radio station, a newspaper or magazine, a library, an on-demand delivery service, a news agency, an educational institution, a governmental agency, a web page or portal, etc. Content provider 110 may provide content in any suitable form, e.g., digital or analog. Service provider 130 enables delivery of the content available from content providers 110 to individual end users in a manner further detailed below. Briefly, service provider 130: (i) obtains the requested content from one or more content providers 110; (ii) if appropriate or necessary, converts the obtained content into a suitable format; (iii) optionally stores the content in one or more of the service provider's data storage units 132; and (iv) forwards the content, via a delivery infrastructure 140, to one or more of the end-user devices 150 for the user's consumption.

Delivery infrastructure 140 might include one or more of the following: a wireline network, an optical communication network, a wireless network, a cable network, a radio broadcast system, and a satellite-based communication system, each together with its enabling components, such as wire lines, optical fibers, transmitters, receivers, signal regenerators, base stations, transmission towers, access points, modems, signal processors and/or converters, switching and/or routing devices, intelligent peripherals, interface devices, servers, firewalls, gateways, and storage devices. Delivery infrastructure 140 might or might not share elements or overlap with network 120. For example, both network 120 and delivery infrastructure 140 might use the Internet to perform their respective functions.

An individual device 150 might have a local storage unit (not explicitly shown), such as an incorporated and/or attached hard drive, a media reader, and/or a flash memory card. In various embodiments of the invention, local storage units can be used to cache and/or more permanently store entertainment and information content. FIG. 1 shows a plurality of exemplary devices 150 belonging to a single end user and appropriately registered with service provider 130. These devices include a personal computer 150-1, a TV set 150-2, a game console 150-3, a cell phone 150-4, and a personal digital assistant (PDA) 150-5. One skilled in the art will appreciate that other suitable end-user devices can similarly be utilized in system 100 after being registered with service provider 130.

Figure 2:
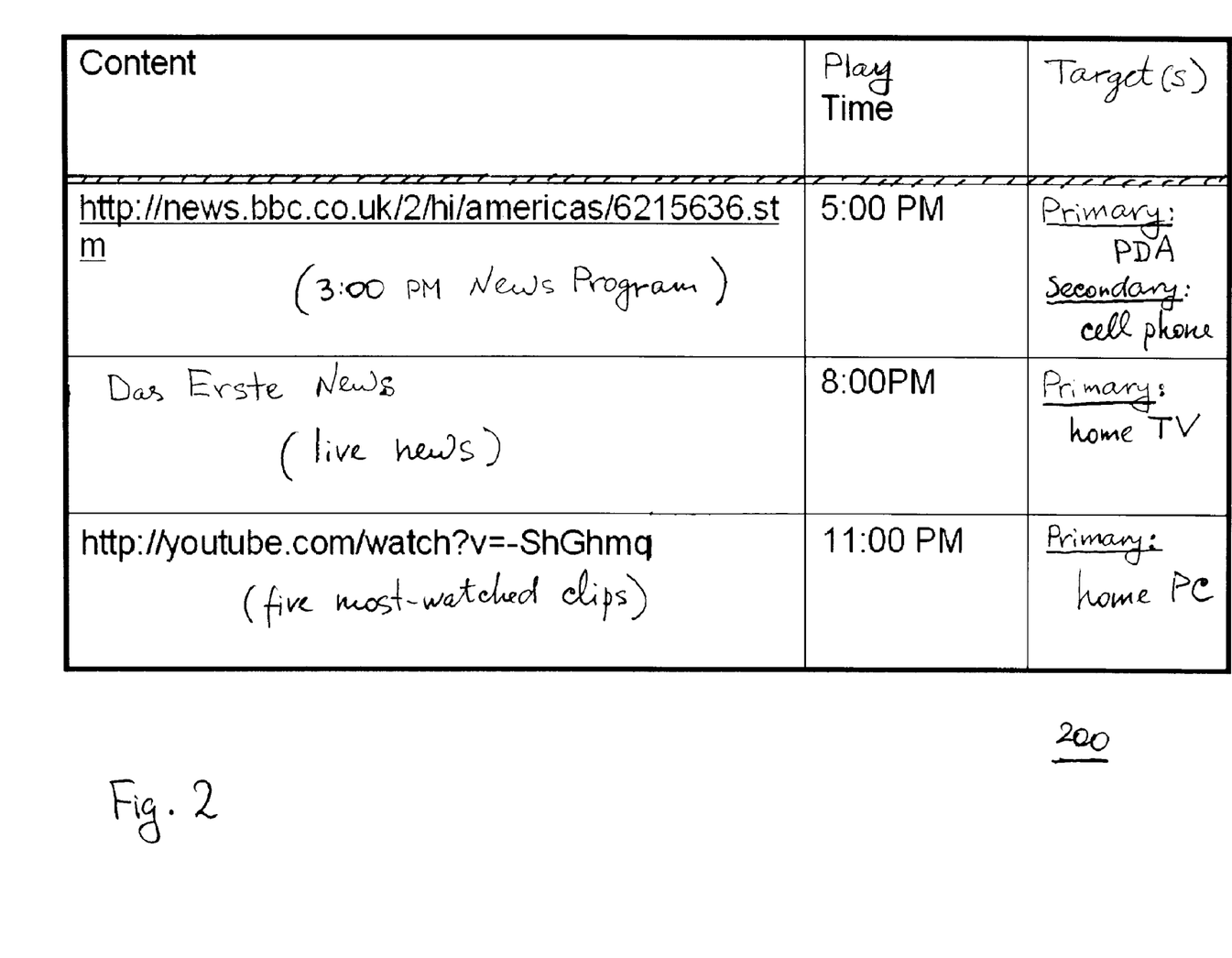
FIG. 2 shows a personal content-definition table that can be used in the communication system of FIG. 1 according to one embodiment of the invention.

FIG. 2 shows a personal content-definition table 200 that can be used in communication system 100 according to one embodiment of the invention. More specifically, table 200 specifies the user-requested content and delivery preferences for one particular day. Table 200 is illustratively shown as having three columns specifying the requested content, play time, and target device(s), respectively. One skilled in the art will appreciate however that other implementations of table 200 might contain a different number of columns and/or have columns that differ from those shown in FIG. 2. Service provider 130 might provide a web-based user interface to enable the end user to fill out an instance of table 200 for any selected date or day of the week. Such a web-based user interface might employ, as known in the art, pull-down menus and link libraries to aid the end user in the compilation of table 200. The end user might choose to fill out table 200 one day, several days, one month, or even several months prior to the corresponding play date/day.

The first entry (row) of table 200 specifies that the end user wants a BBC news program to start playing at five o'clock in the evening on PDA 150-5. The "content" field of the first entry specifies a link to a BBC web site at which the requested news program is or will be available, meaning that, in this particular case, the BBC web site is the corresponding content provider 110. Service provider 130 might obtain the news program from the web site via the Internet, which therefore plays a role of network 120. The requested news program becomes available at the specified IP address preferably before the requested play time, e.g., at 3:00 p.m. on that day, meaning that the first entry of table 200 is a delayed-play entry. A suitable delivery mode and the corresponding delivery infrastructure 140 for delayed-play entries are further detailed below in reference to FIGS. 3-4. Delivery infrastructure 140 can also be used for a real-time delivery scheduled ahead of time.

The "target" field of the first entry specifies that (i) PDA 150-5 is the primary target device and (ii) cell phone 150-4 is the secondary target device, meaning that system 100 will attempt to play the news program on cell phone 150-4 if, at the play time, the end user fails to acknowledge her presence at PDA 150-5. One skilled in the art will appreciate that the "target" field might optionally specify a tertiary target device, a quaternary target device, etc., each of which might be attempted if, at the play time, the end user fails to acknowledge her presence at each of the target devices having a higher priority level. For example, if a tertiary device is specified in the "target" field, then system 100 will attempt to play the news program on that device only after the end user fails to acknowledge her presence at both the primary and secondary target devices. If the end user fails to acknowledge her presence at any of the specified target devices, then system 100 will put a message in the user's mailbox telling the user that she has a delivery corresponding to an entry of personal content-definition table 200. After reading the message at a later time, the user can choose to play the corresponding program or discard it.

The second entry (row) of table 200 specifies that the end user wants a live Das Erste (Channel One) German-language news broadcast to play at eight o'clock in the evening on TV set 150-2. In this particular case, Das Erste Studios in Germany is the corresponding content provider 110. Service provider 130 might obtain a live TV feed from Das Erste Studios via a satellite broadcast channel, which therefore plays a role of network 120. Service provider 130 converts the received TV feed from PAL to NTSC and directs the resulting TV signal to TV set 150-2, e.g., via an IP-based television (IPTV) network, which therefore plays a role of delivery infrastructure 140.

The third entry (row) of table 200 specifies that the end user wants the five most-viewed videos of the day from YouTube to play at eleven o'clock in the evening on the monitor of personal computer 150-1. In this particular case, YouTube.com is the corresponding content provider 110. Service provider 130 might obtain the video files from YouTube.com via the Internet, which therefore plays a role of network 120. Service provider 130 then transfers the video files to personal computer 150-1, e.g., via a virtual-private-network (VPN) connection, which therefore plays a role of delivery infrastructure 140. In one configuration, system 100 might deliver the video files to personal computer 150-1 using a delivery mode that is similar to the delivery mode used for the delayed-play entries, in which case the "most-viewed" status of the delivered files might become somewhat stale at the play time.

A content-delivery mode according to one embodiment of the invention for delivery of delayed-play programs in communication system 100 will now be described in reference to FIGS. 3-4.

Figure 3A:
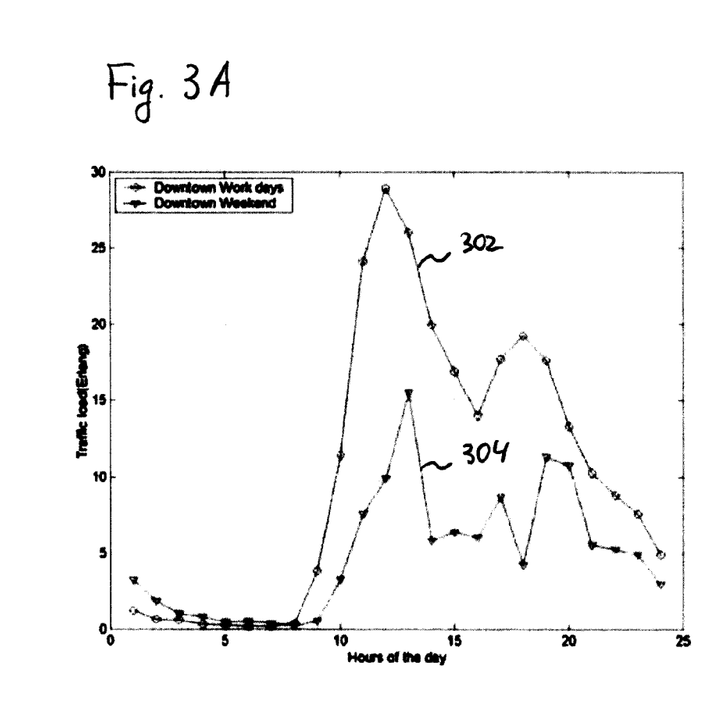
FIGS. 3A-B graphically show representative traffic characteristics for a wireless network that can be part of the delivery infrastructure of the communication system shown in FIG. 1 according to one embodiment of the invention.
Figure 3B:
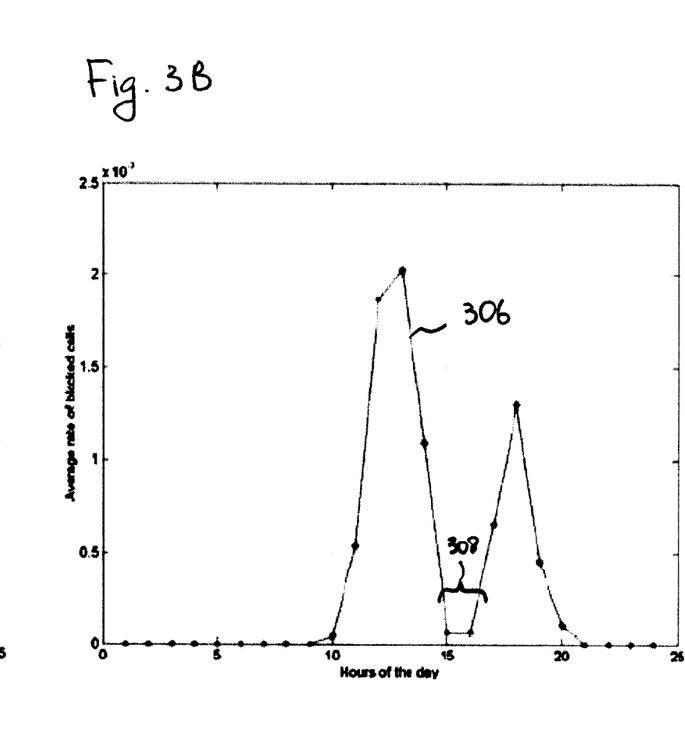

FIGS. 3A-B graphically show representative traffic characteristics for a wireless network that can be part of delivery infrastructure 140 according to one embodiment of the invention. More specifically, FIG. 3A graphically shows the total traffic load in the wireless network as a function of time over a continuous 24-hour period. Curve 302 tracks the total traffic load during a typical workday of the week, and curve 304 tracks the total traffic load during a typical weekend day. FIG. 3B graphically shows the average rate of blocked calls, due to the demand volume exceeding the network capacity, as a function of time over a continuous 24-hour period. Note that curve 306 shown in FIG. 3B and curve 302 shown in FIG. 3A track their respective traffic parameters over the same 24-hour period.

In general, the physical infrastructure of the wireless network is designed to have a capacity that meets the peak traffic load, e.g., occurring on a workday between about 10 a.m. and about 3 p.m. and/or between about 5 p.m. and about 7 p.m. (see FIG. 3A). If the wireless network having these characteristics is going to be used at 5 p.m. for delivering at that time the BBC news program specified in the first entry of table 200 (FIG. 2) from service provider 130 to PDA 150-5 or cell phone 150-4, then there is a relatively high probability for the delivery attempt to be unsuccessful or for the data transmission rate to be unacceptably low due to the nearly maxed-out capacity of the wireless network (see FIG. 3B). However, as the data of FIG. 3B further indicate, there is a delivery-opportunity window 308 for a relatively unhindered delivery of the BBC news program over the wireless network between about 3 p.m. and about 4 p.m. Since the BBC news program becomes available from the corresponding content provider 110 at about 3 p.m., window 308 can be used to download the corresponding video file to the local storage unit(s) associated with PDA 150-5 and/or cell phone 150-4. Once downloaded, the video file can be played at the scheduled play time (i.e., 5 p.m., see table 200) without possible detrimental effects stemming from the relatively high traffic load in the wireless network at that time. In general, according to various embodiments of the invention, communication system 100 is configured to use delivery-opportunity windows analogous to window 308 for delivery of delayed-play programs. For example, according to FIG. 3B, multiple delivery-opportunity windows can be found between (i) about 9 p.m. and midnight and (ii) midnight and about 9 a.m. for delivering suitable delayed-play programs because the total traffic load and the rate of blocked calls are both relatively low.

FIGS. 4A-D pictorially show a method 400 of distributing content that can be used in communication system 100 according to one embodiment of the invention. For illustration purposes, various steps of method 400 are described in reference to the first entry of table 200 (FIG. 2). One skilled in the art will appreciate that method 400 can similarly be used for delivery of other delayed-play programs and/or for delivery of content corresponding to other entries of various personal content-definition tables, such as the third entry of table 200.

Figure 4A:
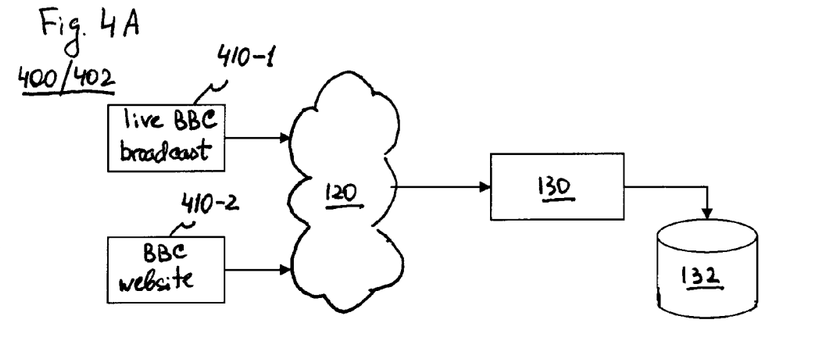
FIGS. 4A-D pictorially show a method of distributing content that can be used in the communication system of FIG. 1 according to one embodiment of the invention.

Referring to FIG. 4A, at step 402 of method 400, service provider 130 obtains the requisite news program from BBC and temporarily stores it in storage unit 132. In one configuration, service provider 130 obtains the news program via a live broadcast 410-1, in which case a cable network carrying the broadcast might serve as network 120. In an alternative configuration, service provider 130 obtains the news program from a web-site 410-2, in which case the Internet might serve as network 120. The news program can be downloaded from web-site 410-2 to storage unit 132 at any suitable time between the program-posting time and the execution time of step 406 depicted in FIG. 4C.

Figure 4B:
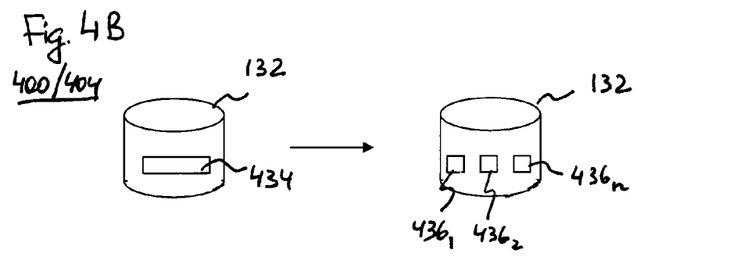

Referring to FIG. 4B, at step 404 of method 400, service provider 130 converts a media file 434 corresponding to the news program into a plurality of data frames 436, each having a relatively small size suitable for transmission over a wireless network 440 (see FIG. 4C), which plays a role of delivery infrastructure 140 (see FIG. 1). In one configuration, data frames 436 might temporarily be stored in storage unit 132 until the transmission time. Alternatively, data frames 436 might be directed to wireless network 440 immediately upon their generation, without being stored in storage unit 132.

Figure 4C:
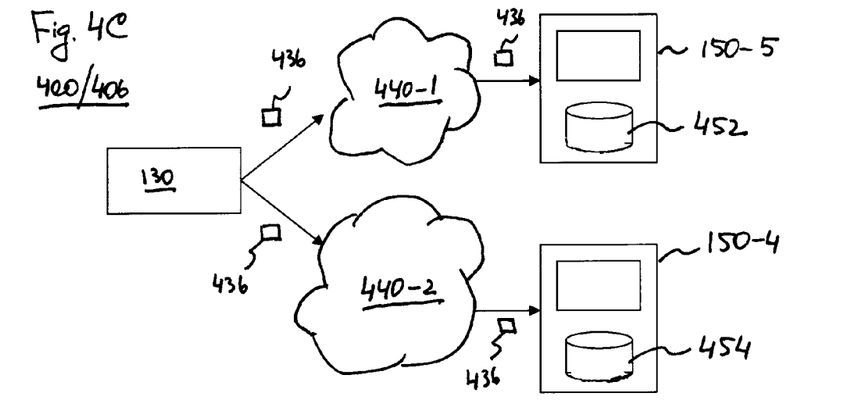

Referring to FIG. 4C, at step 406 of method 400, service provider 130 transmits data frames 436, over wireless network 440-1, to PDA 150-5, which stores the received data frames in a local storage unit 452. Service provider 130 selects the transmission time so that it corresponds to a delivery-opportunity window analogous to window 308 (see FIG. 3B). To determine whether a present time corresponds to a delivery-opportunity window, service provider 130 might query wireless network 440-1 about its current traffic load and then compare the current traffic load with a peak capacity of the wireless network. The present time is deemed to be within a delivery-opportunity window, for example, if the current traffic load constitutes a fraction of the peak capacity that is smaller than 80%, 50%, 10%, or other suitably selected threshold percentile. Alternatively or in addition, service provider 130 might query wireless network 440-1 about its current rate of blocked calls and take that information into consideration in its determination of whether there currently exists a delivery-opportunity window. For example, the present time might be deemed to be within a delivery-opportunity window if both the current traffic load and the rate of blocked calls are below their respective threshold values. Upon receiving the plurality of data frames 436 corresponding to media file 434, PDA 150-5 might reassemble the data file from the data frames and store it in local storage unit 452.

Because, in addition to a primary target device (i.e., PDA 150-5), the first entry of table 200 specifies a secondary target device (i.e., cell phone 150-4), service provider 130 also transmits data frames 436, over wireless network 440-2, to cell phone 150-4, which similarly stores the received data frames in a local storage unit 454. Service provider 130 selects the transmission time so that it corresponds to a delivery-opportunity window in wireless network 440-2. Note that the transmission of data frames 436 over wireless network 440-2 might occur contemporaneously with or at a time different from that of the above-described transmission of those data frames over wireless network 440-1. Upon receiving the plurality of data frames 436 corresponding to media file 434, cell phone 150-4 might also reassemble the media file and store it in local storage unit 454. Further note that individual data frames 436 transmitted over wireless network 440-1 might be different from the corresponding individual data frames 436 transmitted over wireless network 440-2.

In various implementations, step 406 might commence prior to the play time and be completed either after the play time or before the play time. If step 406 is completed after the play time, then it is preferred that a sufficiently large portion of media file 434 is transferred to local storage unit 452 or 454 prior to the play time to enable the target device to start playing the news program without delay and to give service provider 130 some additional time to complete the transfer of the remaining portions of the media file before the data contained therein is actually requested by the media player.

Figure 4D:
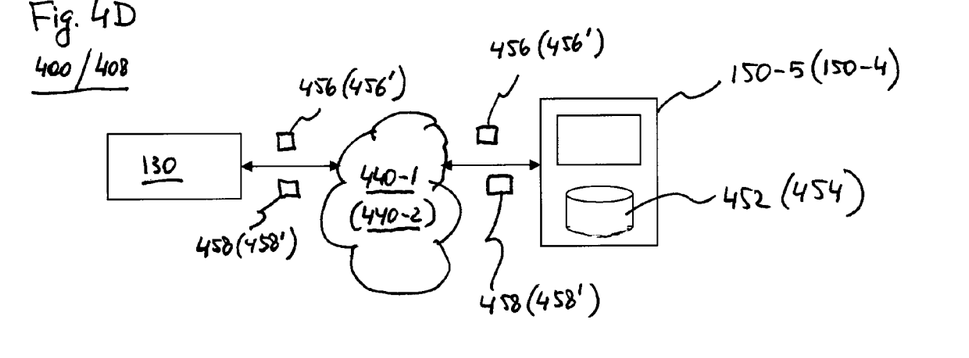

Referring to FIG. 4D, at step 408 of method 400, at the scheduled play time (i.e. 5 p.m., see table 200), service provider 130 transmits to PDA 150-5 a media-activation packet 456. If the end user acknowledges her presence at PDA 150-5, e.g., by pushing a button or touching a touch screen or giving a voice command, then the PDA (1) starts playing the requisite news program by reading a copy of media file 434 from local storage unit 452 and (2) transmits back to the service provider an acknowledgement packet 458. If the end user is not present at PDA 150-5, then service provider 130 will not receive acknowledgement packet 458 and will attempt to have the news program played at the secondary target device (i.e., cell phone 150-4) by repeating the media-activation sequence as indicated in FIG. 4D by the parenthesized labels. More specifically, service provider 130 will transmit to cell phone 150-4 a media-activation packet 456'. If the end user acknowledges her presence at cell phone 150-4, then the cell phone will transmit back to the service provider an acknowledgement packet 458' and will start playing the news program by reading a copy of media file 434 from local storage unit 454. If the end user fails to acknowledge her presence at cell phone 150-4 and no tertiary target device is specified in the corresponding entry of the personal content-definition table, then service provider 130 will abort its further attempts to play the news program.

In various embodiments of the invention, service provider 130 can use quality-of-service (QoS) differentiation between different end users. For example, for an additional enhanced-service fee, service provider 130 might offer a more-reliable content-delivery service to enhanced-service subscribers compared to the content-delivery service available to basic-service subscribers. For example, service provider 130 might route the data to the enhanced-service subscribers via a high-capacity network and/or label the data as having a relatively high (e.g., video) level of priority (see, e.g., QoS specifications of IEEE Standard 802.11). At the same time, service provider 130 might route the data to the basic-service subscribers via a low-capacity network and/or label the data as having a relatively low (e.g., best-effort) level of priority.

While this invention has been described with reference to illustrative embodiments, this description is not intended to be construed in a limiting sense. For example, method 400 (FIG. 4) can be implemented in any (not necessarily wireless) network that experiences significant fluctuations in the total traffic load. For at least some content, service provider 130 can simultaneously be a content provider. Various modifications of the described embodiments, as well as other embodiments of the invention, which are apparent to persons skilled in the art to which the invention pertains are deemed to lie within the principle and scope of the invention as expressed in the following claims.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a microprocessor, a micro-controller, or a general-purpose computer, the machine becomes an apparatus for practicing the invention.

Unless explicitly stated otherwise, each numerical value and range should be interpreted as being approximate as if the word "about" or "approximately" preceded the value of the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. At a content-delivery service provider, a method of distributing content, comprising:
maintaining a content-definition table having a delayed-play entry that specifies (i) a content corresponding to the delayed-play entry, (ii) a play time for the delayed-play entry, and (ii) a first target device for playing the content corresponding to the delayed-play entry;
selecting a first threshold value;
during a time period between (i) a time when said content corresponding to the delayed-play entry becomes available from a corresponding content provider and (ii) said play time, querying a first network about a current traffic load in said first network;
determining presence of a first delivery-opportunity window within said time period by:
comparing the current traffic load in the first network with the first threshold value; and
deciding that the first delivery-opportunity window is present when the current traffic load in the first network is smaller than the first threshold value;
while the first delivery-opportunity window is present, transmitting a media file corresponding to the delayed-play entry over the first network to the first target device for storage in a first local storage unit associated with the first target device to enable the first target device to render the media file at the play time specified in the content-definition table;
selecting a second threshold value;
during said time period, querying a second network about a current traffic load in said second network;
determining presence of a second delivery-opportunity window within said time period by:
comparing the current traffic load in the second network with the second threshold value; and
deciding that the second delivery-opportunity window is present when the current traffic load in the second network is smaller than the second threshold value; and
while the second delivery-opportunity window is present, transmitting the media file, over the second network, to a second target device for storage in a second local storage unit associated with the second target device, wherein the step of transmitting over the second network is completed prior to the play time, wherein:
the first target device is a first end-user device configured to render the media file for an end user; and
the second target device is a second end-user device configured to render the media file for the end user.

2. The method of claim 1, the step of transmitting over the first network is completed at least about one hour prior to the play time.

3. The method of claim 1, further comprising obtaining the media file corresponding to the delayed-play entry using the corresponding content provider.

4. The method of claim 3, wherein the step of obtaining comprises downloading the media file from a website of the corresponding content provider.

5. The method of claim 3, wherein the step of obtaining comprises:
receiving a live-broadcast signal from a TV studio associated with the corresponding content provider; and
generating the media file based on the live-broadcast signal.

6. The method of claim 3, wherein:
the step of obtaining comprises storing the media file in a storage unit associated with the service provider, which storage unit is a remote storage unit with respect to the first target device; and
the step of transmitting comprises forwarding the stored media file from the storage unit associated with the service provider, over the first network, to the first target device for storage in the first local storage unit.

7. The method of claim 6, further comprising converting the media file stored in the storage unit associated with the service provider into a plurality of data frames, wherein:

the step of transmitting comprises transmitting the resulting data frames over the first network to the first target device for storage in the first local storage unit; and the transmitted data frames enable the first target device to reconstruct the media file and have its copy stored in the first local storage unit to enable the first target device to render the media file at the play time.

8. The method of claim 6, wherein the first local storage unit is a part of or physically attached to the first target device.

9. The method of claim 1, wherein the first delivery-opportunity window at least partially overlaps in time with the second delivery-opportunity window.

10. The method of claim 1, further comprising:
at the play time, transmitting a first media-activation packet to initiate playing at the first target device a copy of the media file stored in the first local storage unit; and
if no acknowledgement of user's presence is received from the first target device, transmitting a second media-activation packet to initiate playing at the second target device a copy of the media file stored in the second local storage unit.

11. The method of claim 1, further comprising, at the play time, transmitting a first media-activation packet to initiate rendering at the first target device a copy of the media file stored in the first local storage unit.

12. The method of claim 1, wherein the first network is a wireless network.

13. The method of claim 1, further comprising:
selecting a third threshold value; and
during said time period, querying the first network about a current rate of dropped calls in the first network, wherein:
the determining step further comprises comparing the current rate of dropped calls in the first network with the third threshold value; and
the first delivery-opportunity window is deemed to be present when both of the following conditions are satisfied: (i) the current traffic load in the first network is smaller than the first threshold value and (ii) the current rate of dropped calls in the first network is smaller than the third threshold value.

14. The method of claim 1, further comprising maintaining a user interface to enable a user to fill out the content-definition table.

15. The method of claim 1, wherein, in addition to the delayed-play entry, the personal-channel definition table comprises at least one of (i) a live-program-broadcast entry and (ii) an on-demand-program entry.

16. The method of claim 1, further comprising:
sorting service subscribers into at least two categories;
assigning different priority levels to traffic corresponding to different categories of service subscribers;
routing traffic corresponding to a first priority level via the first network; and
routing traffic corresponding to a second priority level via a different network having a different throughput capacity than the first network.

17. A content-delivery service provider, comprising:
means for maintaining a content-definition table having a delayed-play entry that specifies (i) a content corresponding to the delayed-play entry, (ii) a play time for the delayed-play entry, and (ii) a first target device for playing the content corresponding to the delayed-play entry;
means for selecting a first threshold value;
means for querying a first network about a current traffic load in said first network during a time period between (i) a time when said content becomes available from a corresponding content provider and (ii) said play time;
means for determining presence of a first delivery-opportunity window within said time period, wherein said means for determining comprises:
means for comparing the current traffic load in the first network with the first threshold value; and
means for deciding that the first delivery-opportunity window is present when the current traffic load in the first network is smaller than the first threshold value; and
means for transmitting a media file corresponding to the delayed-play entry over the first network to the first target device, while the first delivery-opportunity window is present, for storage in a first local storage unit associated with the first target device to enable the first target device to render the media file at the play time specified in the content-definition table;
means for selecting a second threshold value;
means for querying a second network about a current traffic load in said second network during said time period;
means for determining presence of a second delivery-opportunity window within said time period, wherein said means for determining comprises:
means for comparing the current traffic load in the second network with the second threshold value; and
means for deciding that the second delivery-opportunity window is present when the current traffic load in the second network is smaller than the second threshold value; and
means for transmitting the media file over the second network to a second target device, while the second delivery-opportunity window is present, for storage in a second local storage unit associated with the second target device to enable the second target device to render the media file at the play time specified in the content-definition table, wherein:
the first target device is a first end-user device configured to render the media file for an end user; and
the second target device is a second end-user device configured to render the media file for the end user.

* * * * *